United States Patent
Yuan et al.

(10) Patent No.: US 12,418,816 B2
(45) Date of Patent: Sep. 16, 2025

(54) MAXIMUM PERMISSIBLE EXPOSURE REPORTING CONFIGURATION IN CARRIER AGGREGATION AND DUAL CONNECTIVITY

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 17/759,783

(22) PCT Filed: Mar. 26, 2020

(86) PCT No.: PCT/CN2020/081346
§ 371 (c)(1),
(2) Date: Jul. 29, 2022

(87) PCT Pub. No.: WO2021/189342
PCT Pub. Date: Sep. 30, 2021

(65) Prior Publication Data
US 2023/0067430 A1    Mar. 2, 2023

(51) Int. Cl.
*H04W 24/10* (2009.01)
*H04W 74/0833* (2024.01)
*H04W 80/02* (2009.01)

(52) U.S. Cl.
CPC ....... *H04W 24/10* (2013.01); *H04W 74/0841* (2013.01); *H04W 80/02* (2013.01)

(58) Field of Classification Search
CPC .. H04W 24/10; H04W 74/0841; H04W 80/02
See application file for complete search history.

(56) References Cited

U.S. PATENT DOCUMENTS 11,368,926 B2 *  6/2022  Sampath ............. H04W 52/367
11,936,458 B2 *  3/2024  Frank ..................... H04B 7/063
(Continued)

FOREIGN PATENT DOCUMENTS

| CN | 110536397 A | 12/2019 |
| WO | 2018111844 | 6/2018 |
| WO | 2019036940 A1 | 2/2019 |

OTHER PUBLICATIONS

3GPP TSG-RAN WG4 Meeting #92bis R4-1911526 Chongqing, China, Oct. 10, 2019-Oct. 18, 2019 Source: Nokia, Nokia Shanghai Bell Title: FR2 MPE mitigation solutions (Year: 2019).*
(Continued)

*Primary Examiner* — Sujoy K Kundu
*Assistant Examiner* — Weibin Huang
(74) *Attorney, Agent, or Firm* — Harrity & Harrity, LLP

(57) ABSTRACT

Various aspects of the present disclosure generally relate to wireless communication. In some aspects, a user equipment (UE) may transmit an uplink message on an uplink channel associated with a special cell (Spcell) to trigger maximum permissible exposure (MPE) reporting based at least in part on an MPE event. The UE may transmit an MPE medium access control (MAC) control element (MAC-CE) to report the MPE event, wherein the MPE MAC-CE is transmitted on a physical uplink shared channel associated with the Spcell or a secondary cell. Numerous other aspects are provided.

26 Claims, 8 Drawing Sheets

(56) References Cited

U.S. PATENT DOCUMENTS

| | | | |
|---|---|---|---|
| 2019/0261289 A1 | 8/2019 | Raghavan et al. | |
| 2020/0021421 A1 | 1/2020 | Han et al. | |
| 2021/0021325 A1* | 1/2021 | Davydov | H04W 76/19 |
| 2023/0061726 A1* | 3/2023 | Jung | H04L 5/0094 |

OTHER PUBLICATIONS

3GPP TSG-RAN WG4 Meeting #92bis, R4-1911526 Chongqing, China, Oct. 10, 2019-Oct. 18, 2019 Source: Nokia, Nokia Shanghai Bell Title: FR2 M mitigation solutions (Year: 2019).*

3GPP TSG RAN WG1#98 meeting, R1-1908784 Prague, CZ, Aug. 26-30, 2019 Source: Sony Title: Enhancements on multi-beam operation (Year: 2019).*

International Search Report and Written Opinion—PCT/CN2020/081346—ISA/EPO—Dec. 30, 2020.

Nokia, et al., "FR2 MPE Mitigation Solutions," 3GPP TSG-RAN WG4 Meeting #92bis, Chongqing, China, Oct. 10-18, 2019, Dec. 17, 2020 (Dec. 17, 2020) 4 pages, section 2.

Nokia, et al., "UE FR2 MPE Enhancements and Solutions", 3GPP RAN WG4 Meeting #94-e, R4-2001382, 3rd Generation Partnership Project, Mobile Competence Centre, 650, Route Des Lucioles, F-06921 Sophia-Antipolis Cedex, France, vol. RAN WG4, No. Online, Feb. 24, 2020-Mar. 6, 2020, Feb. 14, 2020, XP051851300, XP052404617, 5 Pages, section 2-section 3, section 4-5, p. 4-p. 5.

SONY: "Enhancements on Multi-Beam Operation", 3GPP TSG RAN WG1#98 meeting, R1-1908784, 3rd Generation Partnership Project, Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019, 9 pages, XP051765392, section 2, p. 2-p. 3 section 3, p. 4.

Supplementary European Search Report—EP20926716—Search Authority—The Hague—Nov. 13, 2023.

SONY: "Enhancements on Multi-Beam Operation", 3GPP TSG RAN WG1#98 Meeting, R1-1908784, 3rd Generation. Partnership Project, Mobile Competence Centre, 650, Route Des Lucioles, F-06921 Sophia-Antipolis Cedex, France, Vol. RAN WG1, No. Prague, CZ, Aug. 26, 2019-Aug. 30, 2019, Aug. 17, 2019, 9 Pages.

* cited by examiner

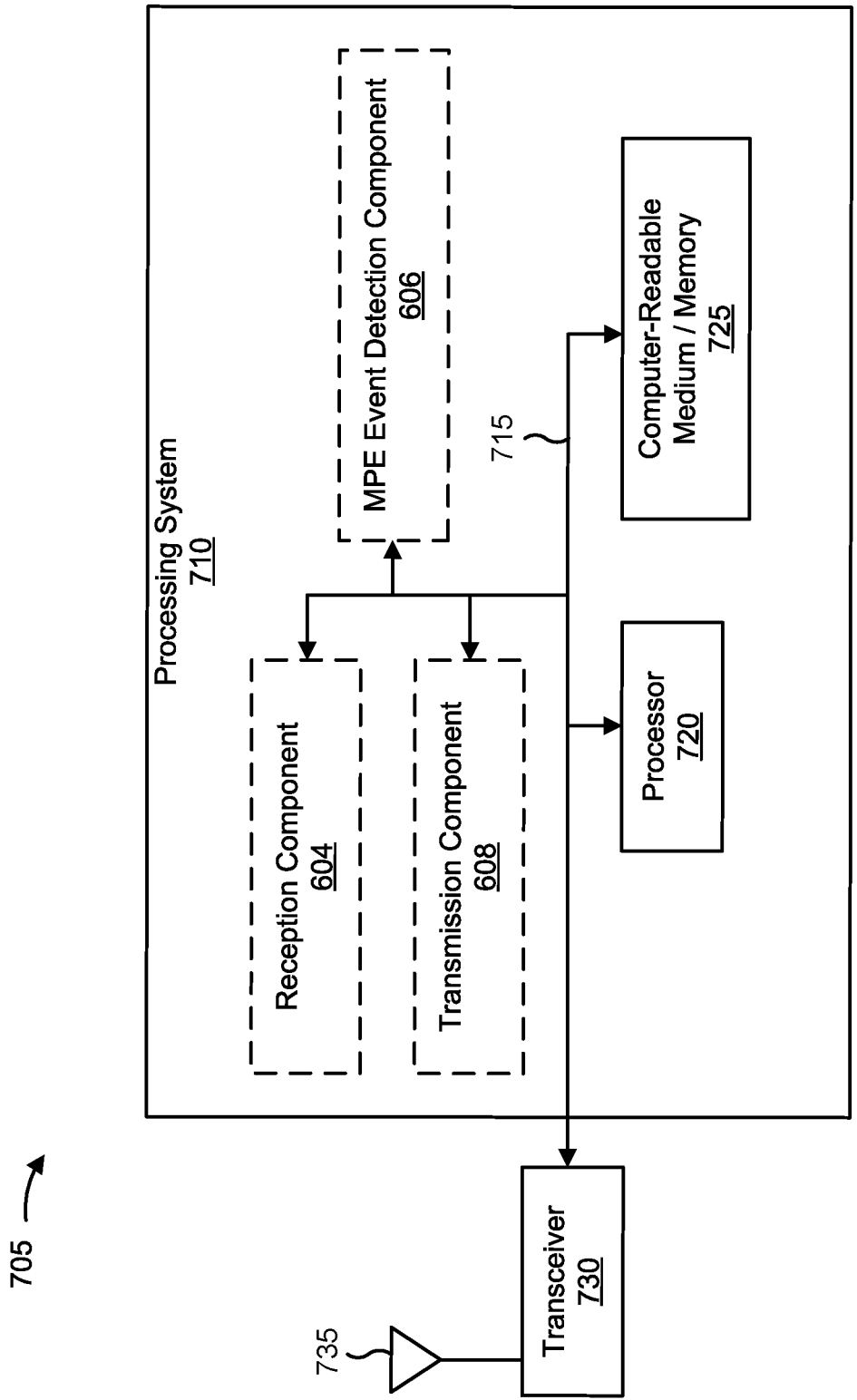

MAXIMUM PERMISSIBLE EXPOSURE REPORTING CONFIGURATION IN CARRIER AGGREGATION AND DUAL CONNECTIVITY

CROSS-REFERENCE TO RELATED APPLICATION

This application is a 371 national stage of Patent Cooperation Treaty (PCT) Application No. PCT/CN2020/081346 filed on Mar. 26, 2020, entitled "MAXIMUM PERMISSIBLE EXPOSURE REPORTING CONFIGURATION IN CARRIER AGGREGATION AND DUAL CONNECTIVITY," which is hereby expressly incorporated by reference herein.

FIELD OF THE DISCLOSURE

Aspects of the present disclosure generally relate to wireless communication and to techniques and apparatuses for providing a maximum permissible exposure (MPE) reporting configuration in carrier aggregation and dual connectivity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include: transmitting an uplink message on an uplink channel associated with a special cell (Spcell) to trigger maximum permissible exposure (MPE) reporting based at least in part on an MPE event; and transmitting an MPE medium access control (MAC) control element (MAC-CE) to report the MPE event, wherein the MPE MAC-CE is transmitted on a physical uplink shared channel (PUSCH) associated with the Spcell or a secondary cell (Scell).

In some aspects, a UE for wireless communication may include a memory and one or more processors operatively coupled to the memory. The memory and the one or more processors may be configured to: transmit an uplink message on an uplink channel associated with an Spcell to trigger MPE reporting based at least in part on an MPE event; and transmit an MPE MAC-CE to report the MPE event, wherein the MPE MAC-CE is transmitted on a PUSCH associated with the Spcell or an Scell.

In some aspects, a non-transitory computer-readable medium may store one or more instructions for wireless communication. The one or more instructions, when executed by one or more processors of a UE, may cause the one or more processors to: transmit an uplink message on an uplink channel associated with an Spcell to trigger MPE reporting based at least in part on an MPE event; and transmit an MPE MAC-CE to report the MPE event, wherein the MPE MAC-CE is transmitted on a PUSCH associated with the Spcell or an Scell.

In some aspects, an apparatus for wireless communication may include: means for transmitting an uplink message on an uplink channel associated with an Spcell to trigger WIPE reporting based at least in part on an WIPE event; and means for transmitting an MPE MAC-CE to report the MPE event, wherein the MPE MAC-CE is transmitted on a PUSCH associated with the Spcell or an Scell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a conceptual data flow diagram illustrating a data flow between different components in an example apparatus, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
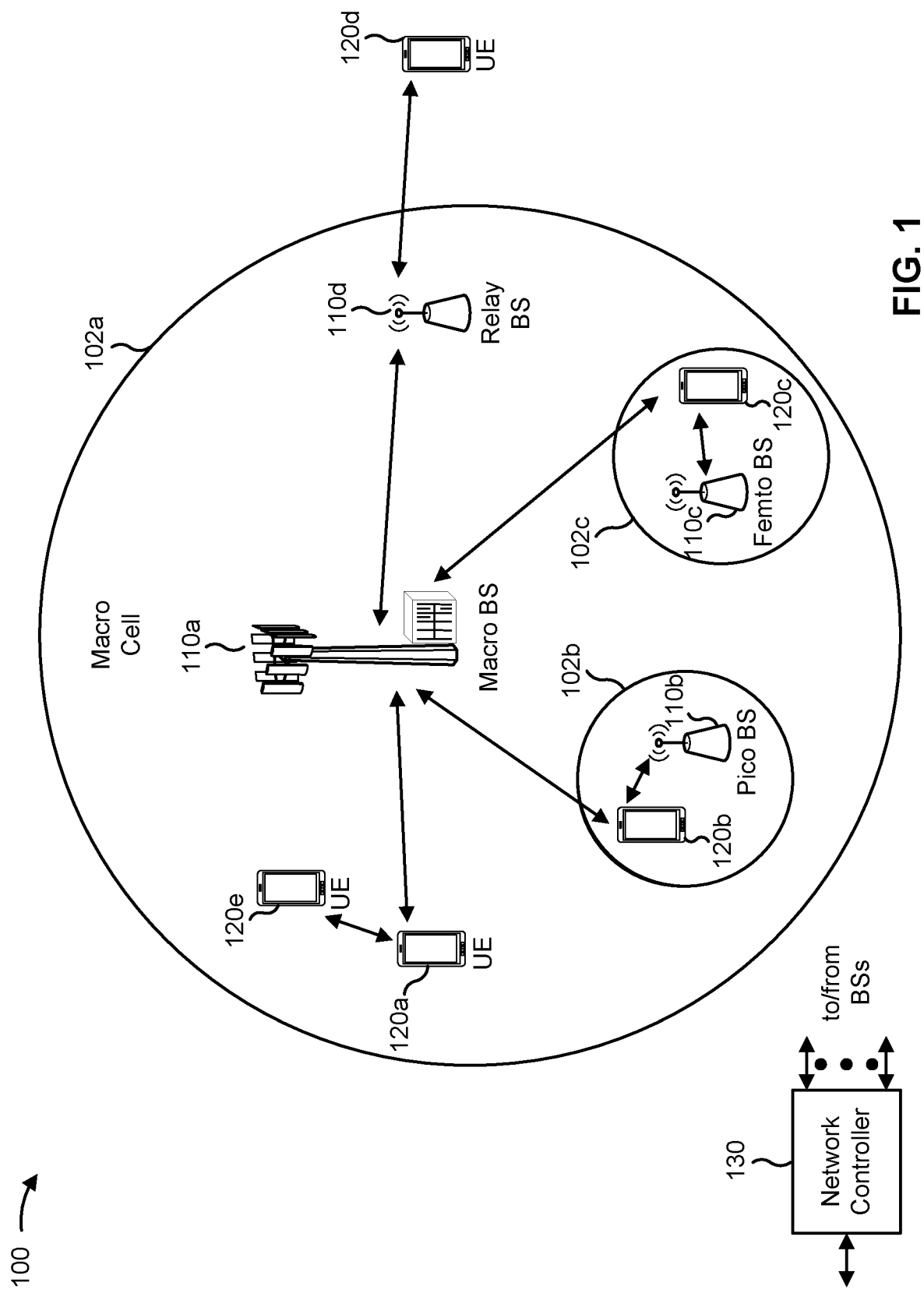
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
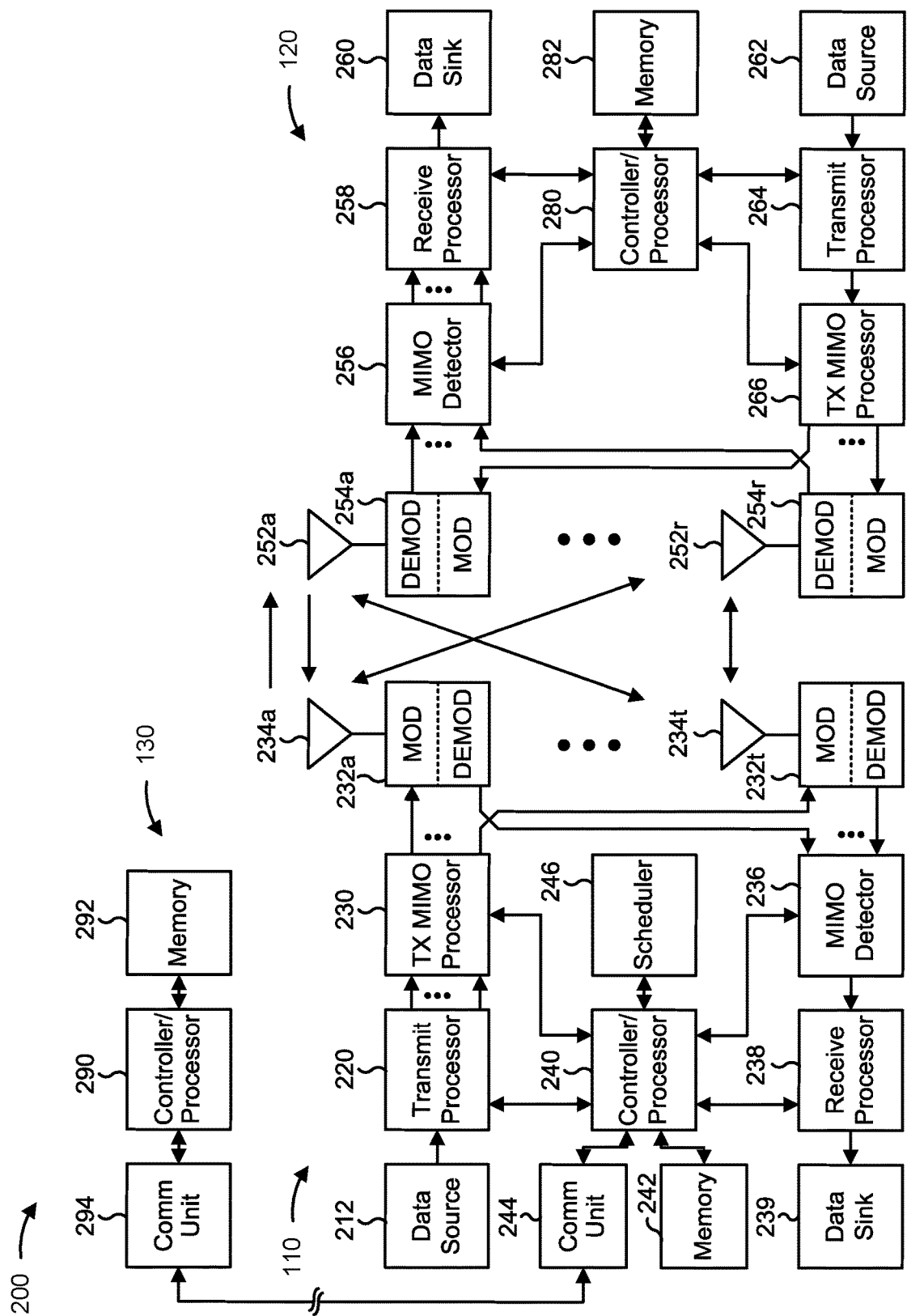
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with providing a maximum permissible exposure (MPE) reporting configuration in carrier aggregation and dual connectivity, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 500 of FIG. 5 and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for transmitting an uplink message on an uplink channel associated with a special cell (Spcell) to trigger MPE reporting based at least in part on an MPE event, means for transmitting an MPE medium access control (MAC) control element (MAC-CE) to report the MPE event, wherein the MPE MAC-CE is transmitted on a physical uplink shared channel (PUSCH) associated with the Spcell or a secondary cell (Scell), and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
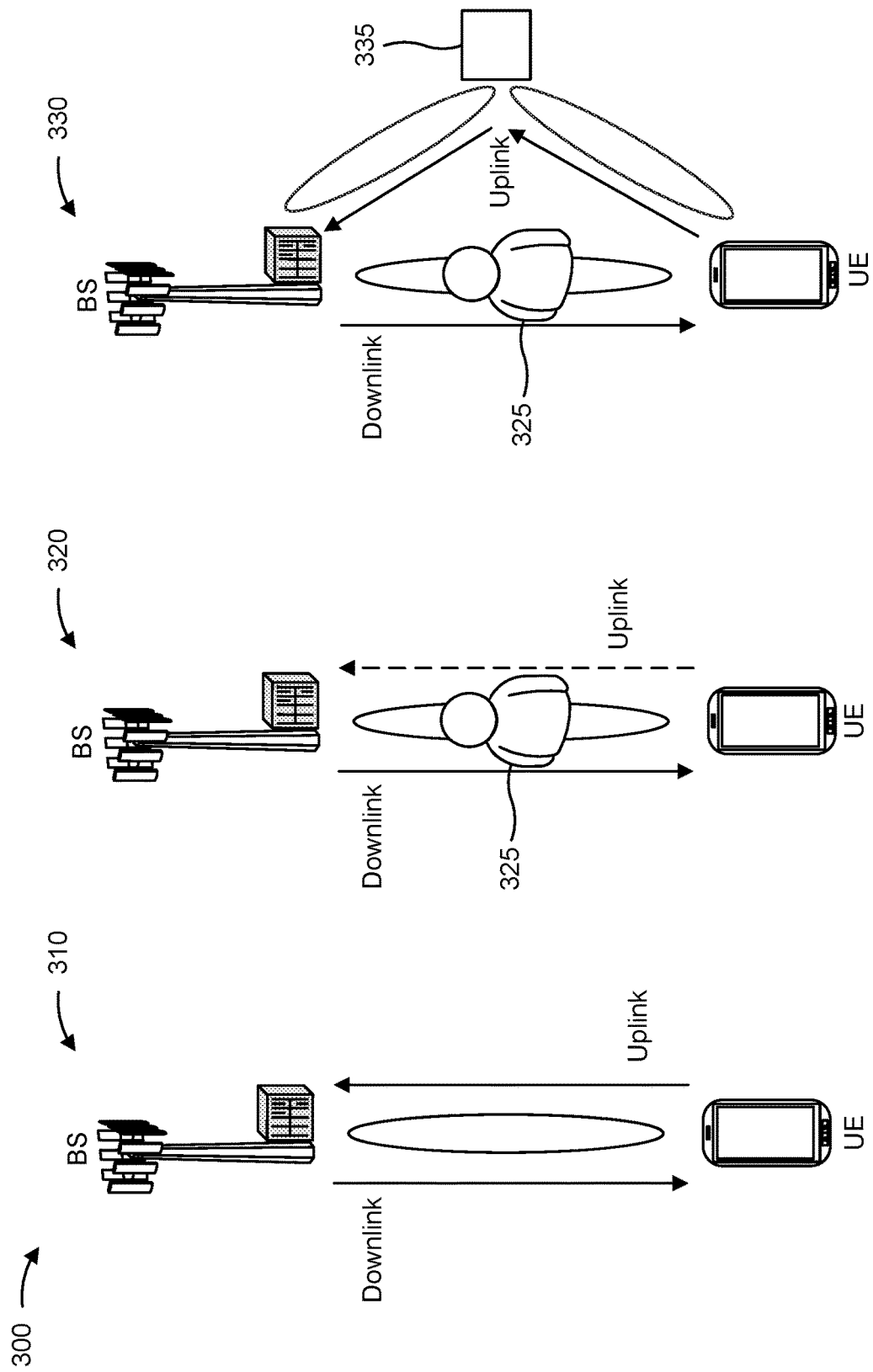
FIG. 3 is a diagram illustrating one or more examples of communications involving a maximum permissible exposure (MPE) event, in accordance with various aspects of the present disclosure.

FIG. 3 is a diagram illustrating one or more examples 300 of communications involving an MPE event, in accordance with various aspects of the present disclosure. As shown in FIG. 3, a UE and a base station may communicate via one or more beams, and a communication via a beam may take a plurality of different paths to reach a receiver. In some cases, a beam may be a millimeter wave (mmWave) beam that carries a communication in the mmWave frequency band. When transmitting in the mmWave frequency band, a transmitter may use a higher antenna gain as compared to transmitting in the sub-6 gigahertz (GHz) frequency band. As a result, the effective isotropic radiated power (EIRP), which represents the radiated power in a particular direction (e.g., the direction of the beam), may be higher for mmWave communications as compared to sub-6 GHz communications.

Because UEs emit radio frequency (RF) waves, microwaves, and/or other radiation, some governing bodies have placed restrictions on the peak EIRP that can be directed toward the human body (e.g., to improve safety). These restrictions, which are sometimes referred to as MPE limitations, MPE constraints, and/or the like, may impose restraints on various operations that the UEs can perform. For example, RF emissions may generally increase when a UE is transmitting, and the RF emissions may further increase in cases where the UE is performing frequent transmissions, high-power transmissions, and/or the like. Accordingly, because frequent and/or high-power transmission may lead to significant RF emissions, regulatory agencies (e.g., the Federal Communications Commission (FCC) in the United States) may provide information related to acceptable RF radiation exposure when UEs are communicating on an uplink, a downlink, a sidelink, and/or the like.

For example, as shown in FIG. 3, and by reference number 310, a UE may communicate with a base station using an uplink beam and/or a downlink beam. In some cases, the uplink beam used by the UE may not be directed toward a human body, and therefore may not be subject to an MPE condition.

As further shown in FIG. 3, and by reference number 320, the uplink beam used by the UE to transmit an uplink communication may become subject to an MPE condition. For example, the uplink beam may become subject to the MPE condition upon the occurrence of an MPE event. The MPE event may be, for example, a human body or body part 325 obstructing the uplink beam (e.g., the beam used by the UE to transmit the uplink transmission may be directed toward the human body or body part 325). That is, the human body or body part 325 may block or obstruct communications to and/or from an antenna subarray of the UE, or may otherwise be positioned near the antenna subarray. In this case, the downlink beam may be suitable for use by the UE to communicate with the base station, but the uplink beam may not be permitted for use when the uplink beam is subject to the MPE condition. For example, the downlink beam may not be subject to an MPE constraint because an EIRP level of a transmission by the base station may subside by the time the transmission reaches the UE and/or the body part 325. However, the uplink beam may be subject to the MPE condition because an EIRP level of a transmission by the UE may exceed a permitted EIRP level due to the close proximity of the UE and the body part 325. In such a case, the UE and/or the base station may use a first beam for uplink communications and a second beam for downlink communications, where the first beam (e.g., an uplink transmit beam used by the UE or an uplink receive beam used by the base station) does not form a reciprocal beam pair with the second beam (e.g., a downlink receive beam used by the UE or a downlink transmit beam used by the base station).

For example, as further shown in FIG. 3, and by reference number 330, the UE may transmit an uplink communication using a different beam than the uplink transmit beam that is subject to the MPE condition. For example, the UE may transmit the uplink communication using an uplink transmit beam included in another cluster that is different from the uplink transmit beam that is subject to the MPE condition. For example, as shown in FIG. 3, the UE may use a beam directed toward an object 335 that provides a path to the base station that is not blocked by the body part 325. In this way, the UE may select non-reciprocal beams (e.g., an uplink transmit beam and a downlink receive beam that are in different clusters) to communicate with the base station even if the base station is using reciprocal beams to communicate with the UE, which enables the UE to satisfy the MPE constraint. However, in some cases, switching the uplink transmit beam to satisfy the MPE constraint may result in uplink coverage loss. Furthermore, in some cases, an MPE condition may occur on multiple (potentially all) uplink transmit beams from the antenna panel of the UE, whereby mitigating uplink coverage loss due to MPE restrictions may need to be performed on a per-panel basis in order to meet regulatory requirements. This may create challenges in certain communication scenarios, such as carrier aggregation or dual connectivity, where a UE may be configured to communicate with a base station using different cells. For example, the UE may need to report an MPE event that is detected on a particular cell, but MPE restrictions may prevent the UE from transmitting the MPE report on the cell on which the MPE event is detected. Furthermore, in cases where the UE is configured to employ inter-band carrier aggregation (e.g., where configured component carriers include a 28 GHz frequency band and a 39 GHz or 60 GHz frequency band), the total MPE across the different frequency bands need to satisfy MPE restrictions.

Some aspects described herein relate to techniques and apparatuses to provide an MPE reporting configuration in carrier aggregation and/or dual connectivity communication scenarios. For example, a UE may determine (e.g., using ultrasound, using wideband and/or narrowband ranging techniques, and/or the like) that an uplink beam associated with a particular cell is subject to an MPE event, and may transmit an MPE communication to a base station that provides an indication of the MPE event. For example, the UE may transmit an uplink communication to trigger MPE reporting via a physical random access channel (PRACH) procedure, a scheduling request procedure, and/or the like based at least in part on a cell on which the MPE condition is detected, and the UE may further transmit an MPE medium access control (MAC) control element (MAC-CE) on a physical uplink shared channel (PUSCH) to report the MPE event. Furthermore, the UE may cancel or stop the triggered MPE reporting when one or more conditions are satisfied. In this way, the UE may be enabled to report an MPE event in a carrier aggregation and/or dual connectivity communication scenario where MPE events may occur in different cells that may have different configurations.

As indicated above, FIG. 3 is provided as an example. Other examples may differ from what is described with respect to FIG. 3.

Figure 4A:
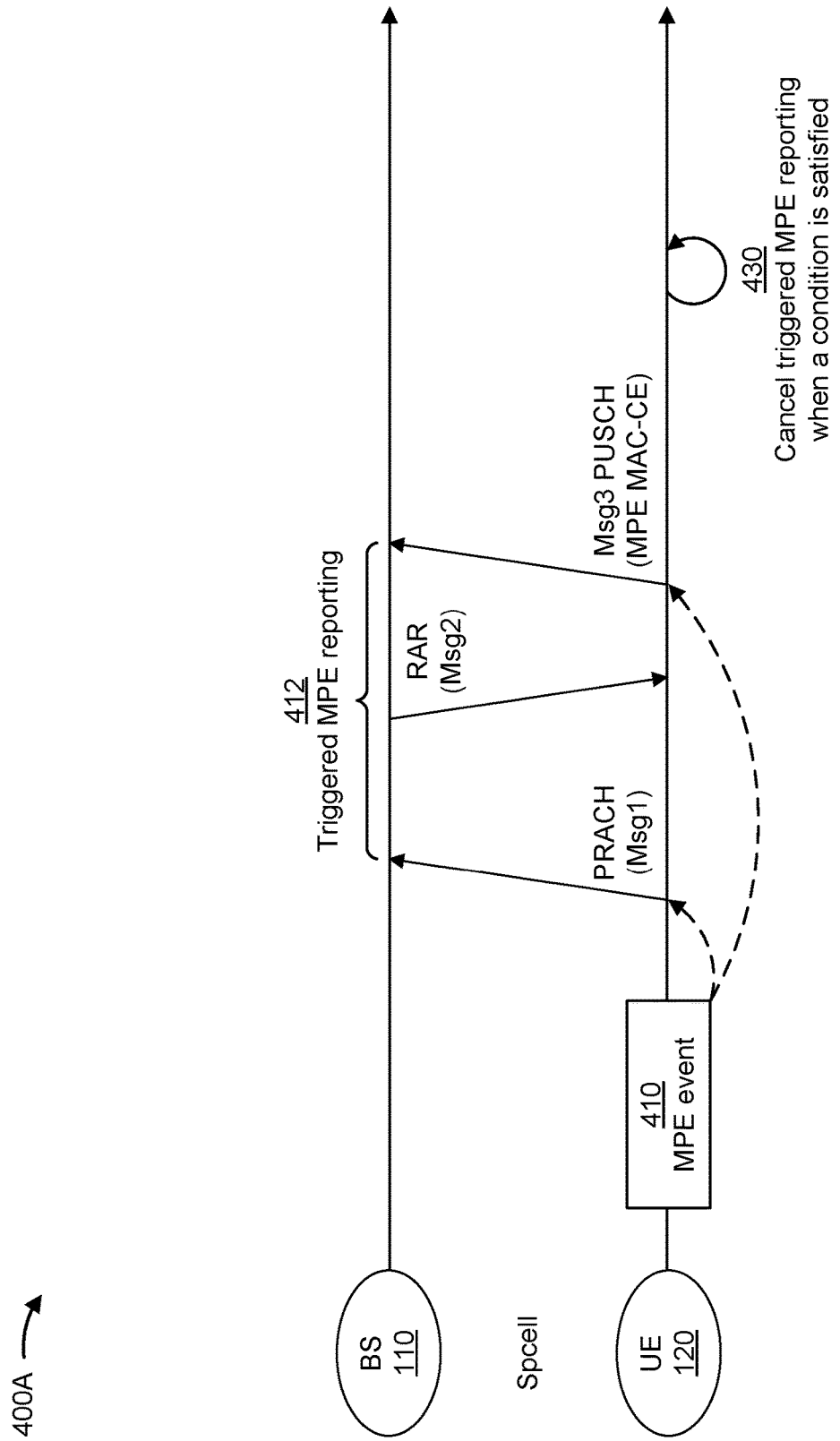
FIGS. 4A-4B are diagrams illustrating one or more examples of providing an MPE reporting configuration in carrier aggregation and dual connectivity, in accordance with various aspects of the present disclosure.
Figure 4B:
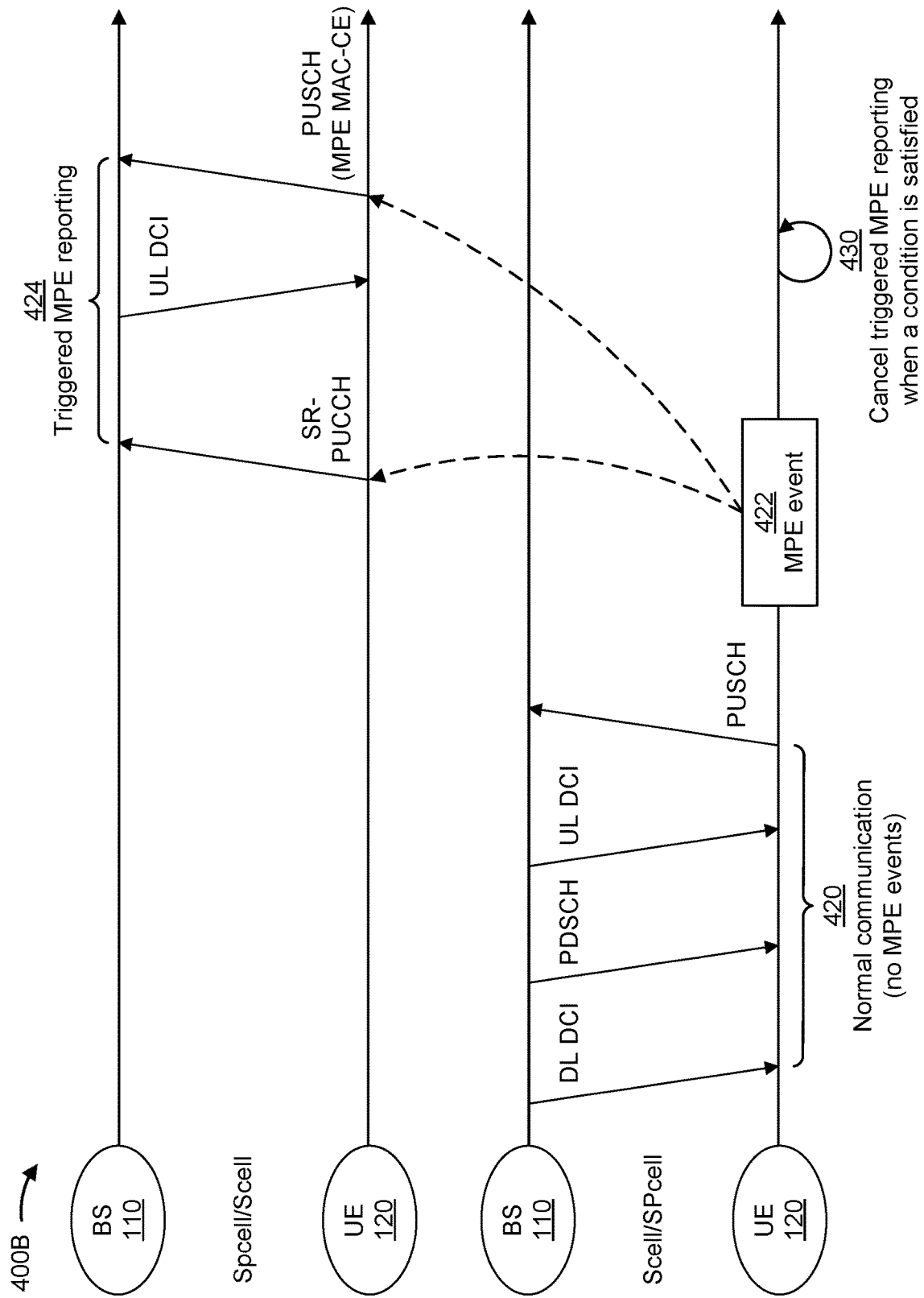

FIGS. 4A-4B are diagrams illustrating one or more examples 400A, 400B of providing an MPE reporting configuration in carrier aggregation and dual connectivity, in accordance with various aspects of the present disclosure. As shown in FIGS. 4A-4B, a UE 120 may communicate with a base station 110 in a wireless network (e.g., wireless network 100). Furthermore, as described herein, the UE 120 and the base station 110 may communicate with one another according to a carrier aggregation configuration, a dual connectivity configuration, and/or the like using uplink beams that are associated with a primary cell (Pcell), one or more secondary cells (Scells), and/or the like.

For example, carrier aggregation may generally enable two or more component carriers (sometimes referred to as carriers) to be combined (e.g., into a single channel) for the UE 120 to enhance data capacity. In general, component carriers can be combined in the same or different frequency bands, the same or different frequency ranges, and/or the like. Additionally, or alternatively, contiguous or non-contiguous component carriers can be combined. In some aspects, the base station 110 may configure carrier aggregation for the UE 120 in an intra-band contiguous mode, where the aggregated component carriers are contiguous to one another and are in the same frequency band. Additionally, or alternatively, carrier aggregation may be configured in an intra-band non-contiguous mode, where the aggregated component carriers are in the same frequency band and are non-contiguous to one another. Additionally, or alternatively, carrier aggregation may be configured in an inter-band non-contiguous mode, where the aggregated component carriers are non-contiguous to one another and are in different frequency bands. In carrier aggregation, the UE 120 may be configured with one cell group that includes up to sixteen (16) different cells. For example, the cell group generally includes one Pcell and up to fifteen (15) Scells. Furthermore, in some cases, one of the Scells may be associated with a physical uplink control channel (PUCCH) configuration (e.g., to offload some PUCCH traffic from the Pcell), which may be referred to as a secondary PUCCH Scell. In other words, a UE can be configured with a cell group including up to 16 component carriers in carrier aggregation operation, where the cell group includes up to two PUCCH cell groups (e.g., a primary PUCCH cell group and optionally a secondary PUCCH cell group). In general, each PUCCH cell group has one special cell (Spcell), which may refer to a particular cell in the PUCCH cell group that is associated with a PUCCH configuration. For example, a primary PUCCH cell group or a secondary PUCCH cell group may include a group of cells whose PUCCH signaling is associated with the PUCCH on the primary PUCCH cell or the secondary PUCCH Scell, respectively. The special cell (Spcell) may be either the primary PUCCH cell (Pcell) in the primary PUCCH cell group or the secondary PUCCH Scell in the secondary PUCCH cell group. Accordingly, in some aspects, a cell group in carrier aggregation operation may include either one or two special cells (Spcells), which may be the cells in each PUCCH cell group that have a PUCCH configuration shared among the group of cells in the respective PUCCH cell group (e.g., the Pcell may be the Spcell in the primary PUCCH cell group and the secondary PUCCH Scell that is associated with the PUCCH configuration may be the Spcell in the secondary PUCCH cell group to offload PUCCH traffic from the Pcell in the primary PUCCH cell group).

In dual connectivity (e.g., multi-RAT dual connectivity (MR-DC), E-UTRA-NR dual connectivity (EN-DC), and/or the like), the UE 120 may be configured with two cell groups to enable the UE 120 to simultaneously connect to multiple cells. For example, the UE 120 may be configured with a master cell group that includes a Pcell and optionally further includes one or more Scells. Furthermore, in some aspects, the UE 120 may be configured with a secondary cell group that includes a primary secondary cell (PScell) or secondary primary cell (SPcell) and optionally further includes one or more additional Scells (e.g., in addition to the Scells in the master cell group). In this case, the term Pcell may refer to a cell that belongs to the master cell group on which the UE 120 performed an initial connection establishment procedure or which became the Pcell through a handover procedure, the term PScell or SPcell may refer to a cell in the secondary cell group in which the UE 120 performs random access when the secondary cell group is configured for the UE (e.g., in dual connectivity operation), and the term Scell may refer to an additional cell that belongs to either the master cell group or the secondary cell group and is configured by the base station 110 to provide the UE 120 with additional bandwidth. Furthermore, in a similar manner as described above, the terms special cell and Spcell in dual connectivity refer to a cell associated with a PUCCH configuration, which may be the Pcell in the master cell group or the PScell (or SPcell) in the secondary cell group.

In some aspects, as described herein, the UE 120 may employ different MPE reporting procedures depending on whether an MPE event is detected on an Spcell or detected on an Scell, a PScell, an SPcell, and/or the like. Furthermore, in some aspects, the UE 120 may cancel MPE reporting that is triggered based at least in part on an MPE event when one or more conditions are satisfied (e.g., when parameters that the UE 120 and base station 110 use to communicate have been changed such that continuing to report the MPE event is no longer necessary). For example, in some aspects, FIG. 4A illustrates an example 400A of an MPE reporting procedure that may be employed when the UE 120 detects an MPE event on an Spcell, and FIG. 4B illustrates an example 400B of an MPE reporting procedure that may be employed when the UE 120 detects an MPE event on an Scell, a PScell, an SPcell, and/or the like. Furthermore, as described herein, FIG. 4A and FIG. 4B both illustrate that the UE 120 may cancel MPE reporting that has been triggered when one or more conditions are satisfied.

As shown in FIG. 4A, and by reference number 410, the UE 120 may detect an MPE event associated with an uplink transmit beam that the UE 120 is using to communicate with the base station on a special cell (Spcell). For example, as described above, the MPE event may be detected based at least in part on a human body, body part, and/or the like blocking the beam, being located near an antenna subarray, and/or the like. Accordingly, in some aspects, the UE 120 may detect (e.g., using ultrasound, using wideband and/or narrowband ranging techniques, and/or the like) whether an antenna subarray of the UE 120 is near and/or obstructed by a human body or body part, whether a directional beam of the UE 120 is directed toward and/or obstructed by the human body or body part, and/or the like. Accordingly, when the UE 120 detects the MPE event on the Spcell, the UE 120 may determine that an uplink transmit beam, or one or more component carriers associated with the uplink transmit beam, are subject to an MPE condition such that the UE 120 is not permitted to use the uplink transmit beam or the component carrier(s) associated with the uplink transmit beam. In other words, the UE 120 may be subject to a transmission limitation on the Spcell due to the MPE event (e.g., a limit on an antenna gain, a limit on a transmit power, and/or the like).

As further shown in FIG. 4A, and by reference number 412, the UE 120 may initiate a physical random access channel (PRACH) procedure on the Spcell to trigger MPE reporting based at least in part on detecting the MPE event on the Spcell. For example, in some aspects, the UE 120 may transmit a PRACH preamble to the base station 110 (e.g., in msg1 of a four-step RACH procedure, a msgA preamble of a two-step RACH procedure, and/or the like) to initiate the PRACH procedure, and the UE 120 may subsequently transmit an MPE MAC-CE to the base station 110 to report the MPE event in a PUSCH communication (e.g., in msg3 of a four-step RACH procedure, a msgA payload of a two-step RACH procedure, and/or the like). Furthermore, in the case of a four-step RACH procedure, the UE 120 may receive, from the base station 110 as a reply to the PRACH preamble transmission, a random access response (RAR) message scheduling the PUSCH in which the UE 120 transmits the MPE MAC-CE. In some aspects, the MPE MAC-CE may indicate information related to the MPE event to the base station 110, such as a cell identifier, a bandwidth part identifier, and/or the like.

In some aspects, when the UE 120 transmits the PRACH preamble to initiate the PRACH procedure and thereby trigger the MPE reporting, the UE 120 may switch to a different bandwidth part on the Spcell that is configured with PRACH resources (e.g., because the UE 120 may be restricted from transmitting using the bandwidth part in which the MPE event was detected). For example, in some aspects, the Spcell may be configured with multiple bandwidth parts, one or more of which may be configured with PRACH resources (e.g., PRACH preambles, RACH occasions (ROs), and/or the like). Accordingly, as described herein, the UE 120 may detect the MPE event on a first bandwidth part associated with the Spcell, and the UE 120 may perform the uplink transmission of the PRACH preamble to trigger the MPE reporting on a second bandwidth part associated with the Spcell that is configured with PRACH resources. For example, in some aspects, the UE 120 may perform the uplink transmission of the PRACH preamble using a bandwidth part on a primary uplink carrier that is configured with PRACH resources, a bandwidth part on a supplemental uplink carrier that is configured with PRACH resources, and/or the like. Additionally, or alternatively, the UE 120 may perform the uplink transmission of the PRACH preamble using a bandwidth part on the uplink carrier associated with the MPE event, which may correspond to the primary uplink carrier or the supplemental uplink carrier. Additionally, or alternatively, the UE 120 may perform the uplink transmission of the PRACH preamble using a bandwidth part on an uplink carrier associated with a low frequency band (e.g., relative to the other uplink carrier(s) configured for the UE 120), as the low frequency band may have a lower MPE impact. For example, in some cases, the low frequency band may correspond to the supplemental uplink carrier, which may be configured in the low frequency band to extend a coverage range.

In some aspects, the UE 120 may further select a particular bandwidth part and/or cell to transmit the MPE MAC-CE used to report the MPE event when the MPE event is detected on the Spcell. For example, in some aspects, the UE 120 may transmit the MPE MAC-CE on a PUSCH associated with the same bandwidth part and/or cell as used to transmit the PRACH preamble. Additionally, or alternatively, the UE 120 may transmit the MPE MAC-CE on a PUSCH associated with any bandwidth part and/or cell in the same cell group as the Spcell (e.g., a carrier aggregation cell group, a master cell group in dual connectivity when the Spcell is a Pcell, a secondary cell group in dual connectivity when the Spcell is a PScell, and/or the like).

As shown in FIG. 4B, and by reference number 420, the UE 120 may communicate with the base station 110 on an Scell, an SPcell, and/or the like. For example, in some aspects, the base station 110 may transmit one or more physical downlink control channel (PDCCH) communications including downlink control information (DCI) to schedule one or more physical downlink shared channel (PDSCH) communications to be transmitted to the UE 120. Furthermore, in some aspects, the base station 110 may transmit one or more PDCCH communications that include DCI to schedule a PUSCH communication by the UE 120.

As further shown in FIG. 4B, and by reference number 422, the UE 120 may detect an MPE event associated with an uplink transmit beam that the UE 120 is using to communicate with the base station on the Scell, the SPcell, and/or the like (e.g., an uplink transmit beam used to transmit the PUSCH). For example, as described above, the MPE event may be detected based at least in part on a human body, body part, and/or the like blocking the beam, being located near an antenna subarray, and/or the like. Accordingly, when the UE 120 detects the MPE event on the Scell, the SPcell, and/or the like, the UE 120 may determine that the UE 120 is not permitted to transmit using the uplink transmit beam or the component carrier(s) associated with the uplink transmit beam. In other words, the UE 120 may be subject to a transmission limitation on the Scell, the SPcell, and/or the like due to the MPE event.

As further shown in FIG. 4B, and by reference number 424, the UE 120 may initiate a scheduling request procedure to trigger MPE reporting based at least in part on detecting the MPE event on the Scell, the SPcell, and/or the like. For example, as shown in FIG. 4B, the UE 120 may transmit a scheduling request to the base station 110 on a PUCCH associated with an Spcell, and the base station 110 may subsequently transmit a PDCCH including DCI to schedule a PUSCH by the UE 120. Accordingly, the UE 120 may transmit, to the base station, an MPE MAC-CE to report the MPE event in a PUSCH communication. For example, in some aspects, the MPE MAC-CE to report the MPE event on the Scell or SPcell may be transmitted on the PUSCH associated with any Scell or Spcell in the same cell group or a different cell group as the Scell or SPcell associated with the MPE event other than the Scell or SPcell associated with the MPE event, which may be excluded from the available PUSCH options due to the transmission limitations imposed by the MPE event.

As further shown in FIG. 4A and FIG. 4B, and by reference number 430, the UE 120 may cancel MPE reporting when one or more conditions are satisfied. For example, in some aspects, the UE 120 may cancel MPE reporting that has been triggered for a cell (e.g., an Spcell, an Scell, an SPcell, and/or the like) based at least in part on transmitting the MPE MAC-CE to report the MPE event. Additionally, or alternatively, the UE 120 may cancel the MPE reporting triggered for a cell based at least in part on receiving DCI to schedule a new PUSCH with the same hybrid automatic repeat request (HARQ) identifier as the PUSCH used to transmit the MPE MAC-CE. For example, as described above, the MPE MAC-CE is generally transmitted on a PUSCH associated with an Spcell or an Scell, and in some cases, the PUSCH may not be associated with any acknowledgement and/or negative acknowledgement information. Accordingly, after the UE 120 transmits the MPE MAC-CE, the UE 120 may wait until DCI scheduling another new PUSCH communication is received. In this case, the DCI scheduling the next new PUSCH communication may indicate the same HARQ identifier as the PUSCH used to transmit the MPE MAC-CE to indicate that the base station 110 successfully received the MPE MAC-CE such that the UE 120 can cancel the MPE reporting. Additionally, or alternatively, the UE 120 may cancel the MPE triggered for a cell based at least in part on receiving, on a control resource set (CORESET), DCI scrambled by a special radio network temporary identifier (RNTI). For example, in some aspects, the DCI may schedule an uplink grant after the scheduling request is transmitted from the UE 120 to the base station 110, and the DCI may be scrambled by the special RNTI and/or may be transmitted on a special CORESET to acknowledge the MPE MAC-CE. In this case, the DCI may similarly indicate that the base station 110 successfully received the MPE MAC-CE such that the UE 120 can cancel the MPE reporting. Additionally, or alternatively, the UE 120 may cancel MPE reporting triggered for a particular serving cell based at least in part on DCI, radio resource control (RRC) signaling, and/or other signaling causing the UE 120 to switch bandwidth parts on the corresponding serving cell.

In some aspects, in cases where MPE reporting is triggered for an Scell and/or PScell, the UE 120 may cancel the MPE reporting for the Scell and/or PScell based at least in part on receiving information from the base station 110 indicating that the Scell and/or PScell has been deactivated, removed, and/or transitioned to a dormancy state. For example, when the Scell and/or PScell has been deactivated, removed, and/or transitioned to a dormancy state, the UE 120 may no longer communicate via the deactivated, removed, and/or dormant cell, and may therefore cancel MPE reporting for the corresponding serving cell. Additionally, or alternatively, the UE 120 may cancel the MPE reporting for the Scell, PScell, SPcell, and/or the like based at least in part on a MAC reset that affects the corresponding serving cell.

In some aspects, in cases where MPE reporting is triggered for an Spcell, the UE 120 may cancel the MPE reporting for the Spcell based at least in part on successfully completing a random access procedure that the UE 120 initiates after switching bandwidth parts due to the MPE event. For example, when the UE 120 detects the MPE event on a bandwidth part associated with the Spcell, the UE 120 may be restricted from performing further transmissions on the same bandwidth part. Accordingly, the UE 120 may need to switch to a different bandwidth part and perform a random access procedure via the new bandwidth part for reporting the MPE event. In some aspects, the UE 120 may therefore cancel MPE reporting triggered for the Spcell after the UE 120 has switched to a different bandwidth part and completed the random access procedure via the new bandwidth part. Furthermore, in cases where an MPE event on the Spcell causes the UE 120 to switch bandwidth parts, the UE 120 may terminate any ongoing random access procedure to initiate a new random access procedure on the new bandwidth part, and the UE 120 may reset one or more preamble and power ramping counters. For example, when the UE 120 performs a random access procedure, the UE 120 may transmit a PRACH preamble using an initial transmit power and may increment the one or more preamble and power ramping counters according to a preamble power ramping step (e.g., a delta value indicating an amount by which transmit power for a subsequent transmission is increased) each time the PRACH preamble is transmitted until the one or more preamble and power ramping counters reach a maximum value. Accordingly, when the UE 120 terminates an ongoing random access procedure to initiate a new random access procedure on a new bandwidth part, the preamble and power ramping counter(s) may be reset to prevent the UE 120 from prematurely reaching the maximum transmission power for the PRACH preamble.

As indicated above, FIGS. 4A-4B are provided as one or more examples. Other examples may differ from what is described with respect to FIGS. 4A-4B.

Figure 5:
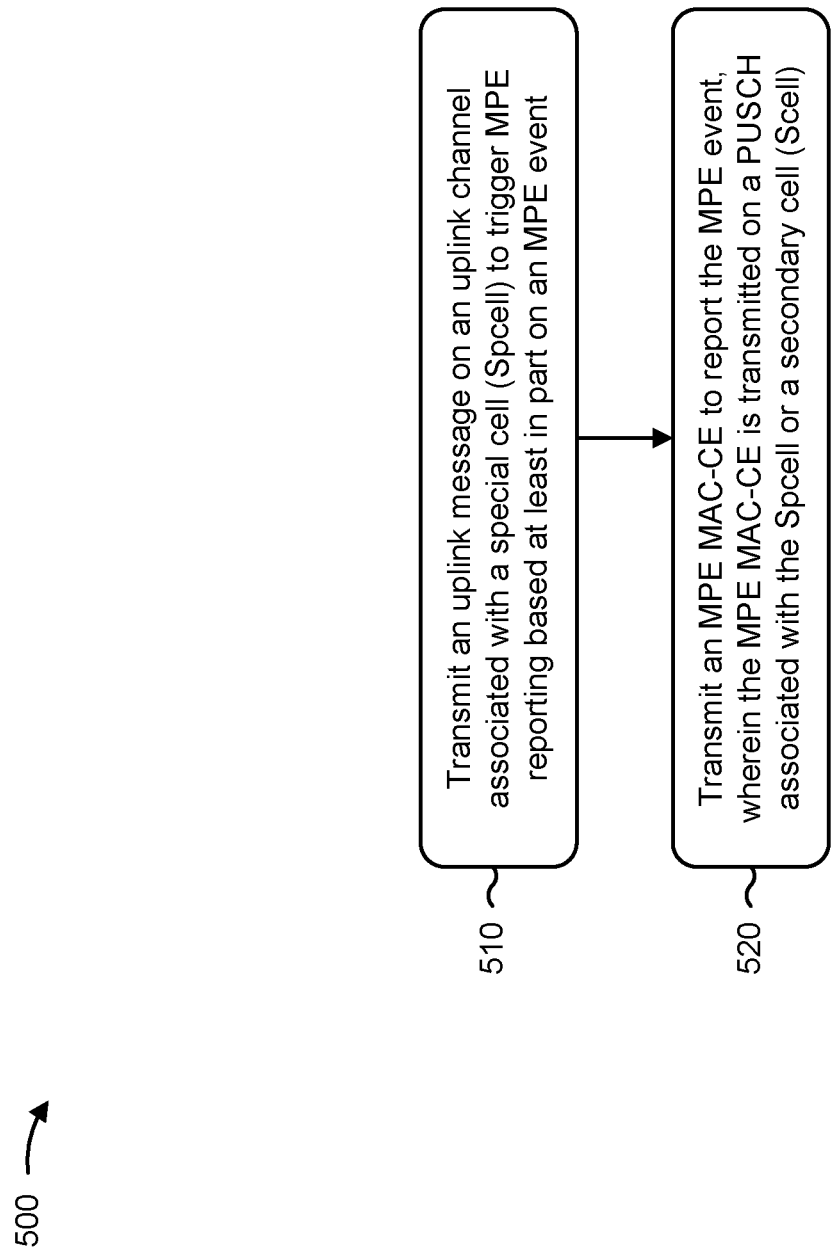
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with an MPE reporting configuration in carrier aggregation and dual connectivity.

As shown in FIG. 5, in some aspects, process 500 may include transmitting an uplink message on an uplink channel associated with an Spcell to trigger MPE reporting based at least in part on an MPE event (block 510). For example, the UE may transmit (e.g., using controller/processor 280, transmit processor 264, TX MIMO processor 266, MOD 254, antenna 252, memory 282, and/or the like) an uplink message on an uplink channel associated with an Spcell to trigger MPE reporting based at least in part on an MPE event, as described above.

As further shown in FIG. 5, in some aspects, process 500 may include transmitting an MPE MAC-CE to report the MPE event, wherein the MPE MAC-CE is transmitted on a PUSCH associated with the Spcell or an Scell (block 520). For example, the UE may transmit (e.g., using controller/processor 280, transmit processor 264, TX MIMO processor 266, MOD 254, antenna 252, memory 282, and/or the like) an MPE MAC-CE to report the MPE event, as described above. In some aspects, the MPE MAC-CE is transmitted on a PUSCH associated with the Spcell or an Scell.

Process 500 may include additional aspects, such as any single aspect or any combination of aspects described below and/or in connection with one or more other processes described elsewhere herein.

In a first aspect, the uplink message is transmitted to trigger a PRACH procedure on the Spcell based at least in part on detecting the MPE event on the Spcell.

In a second aspect, alone or in combination with the first aspect, the uplink message is transmitted on a bandwidth part associated with the Spcell that is configured with PRACH resources.

In a third aspect, alone or in combination with one or more of the first and second aspects, the bandwidth part used to transmit the uplink message is associated with one or more of an uplink carrier or a supplemental uplink carrier associated with the Spcell.

In a fourth aspect, alone or in combination with one or more of the first through third aspects, the bandwidth part used to transmit the uplink message is associated with an uplink carrier on which the MPE event is detected.

In a fifth aspect, alone or in combination with one or more of the first through fourth aspects, the bandwidth part used to transmit the uplink message is associated with a supplemental uplink carrier in a low frequency band.

In a sixth aspect, alone or in combination with one or more of the first through fifth aspects, the PUSCH used to transmit the MPE MAC-CE is associated with a bandwidth part in which the uplink message triggering the PRACH procedure is transmitted.

In a seventh aspect, alone or in combination with one or more of the first through sixth aspects, the PUSCH used to transmit the MPE MAC-CE is associated with a bandwidth part in a cell group that includes the Spcell.

In an eighth aspect, alone or in combination with one or more of the first through seventh aspects, the uplink message is transmitted to trigger a scheduling request procedure on a PUCCH of the Spcell based at least in part on detecting the MPE event on one or more of an Scell or an SPcell.

In a ninth aspect, alone or in combination with one or more of the first through eighth aspects, the Spcell or Scell associated with the PUSCH used to transmit the MPE MAC-CE excludes the Scell or the SPcell in which the MPE event is detected.

In a tenth aspect, alone or in combination with one or more of the first through ninth aspects, process 500 includes cancelling the MPE reporting for a cell associated with the MPE event based at least in part on transmitting the MPE MAC-CE.

In an eleventh aspect, alone or in combination with one or more of the first through tenth aspects, process 500 includes cancelling the MPE reporting for a cell associated with the MPE event based at least in part on receiving information scheduling a new PUSCH having a HARQ identifier that corresponds to the PUSCH used to transmit the MPE MAC-CE.

In a twelfth aspect, alone or in combination with one or more of the first through eleventh aspects, process 500 includes cancelling the MPE reporting for a cell associated with the MPE event based at least in part on receiving DCI scrambled by an RNTI on a CORESET used to acknowledge the MPE MAC-CE.

In a thirteenth aspect, alone or in combination with one or more of the first through twelfth aspects, process 500 includes cancelling the MPE reporting for an Scell or a PScell associated with the MPE event based at least in part on the Scell or the PScell being deactivated, removed, or transitioned to a dormancy state.

In a fourteenth aspect, alone or in combination with one or more of the first through thirteenth aspects, process 500 includes cancelling the MPE reporting for an Scell or a PScell associated with the MPE event based at least in part on a MAC reset affecting a serving cell corresponding to the Scell or the PScell.

In a fifteenth aspect, alone or in combination with one or more of the first through fourteenth aspects, process 500 includes cancelling the MPE reporting for an Spcell associated with the MPE event based at least in part on successful completion of a random access procedure initiated after switching from a first bandwidth part to a second bandwidth part due to the MPE event.

In a sixteenth aspect, alone or in combination with one or more of the first through fifteenth aspects, process 500 includes cancelling the MPE reporting based at least in part on receiving DCI or RRC signaling causing a switch from a first bandwidth part to a second bandwidth part.

In a seventeenth aspect, alone or in combination with one or more of the first through sixteenth aspects, process 500 includes terminating an ongoing random access procedure and initiating a new random access procedure based at least in part on the MPE event causing a switch from a first bandwidth part to a second bandwidth part on the Spcell.

In an eighteenth aspect, alone or in combination with one or more of the first through seventeenth aspects, process 500 includes resetting a preamble and power ramping counter associated with the ongoing random access procedure based at least in part on initiating the new random access procedure.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
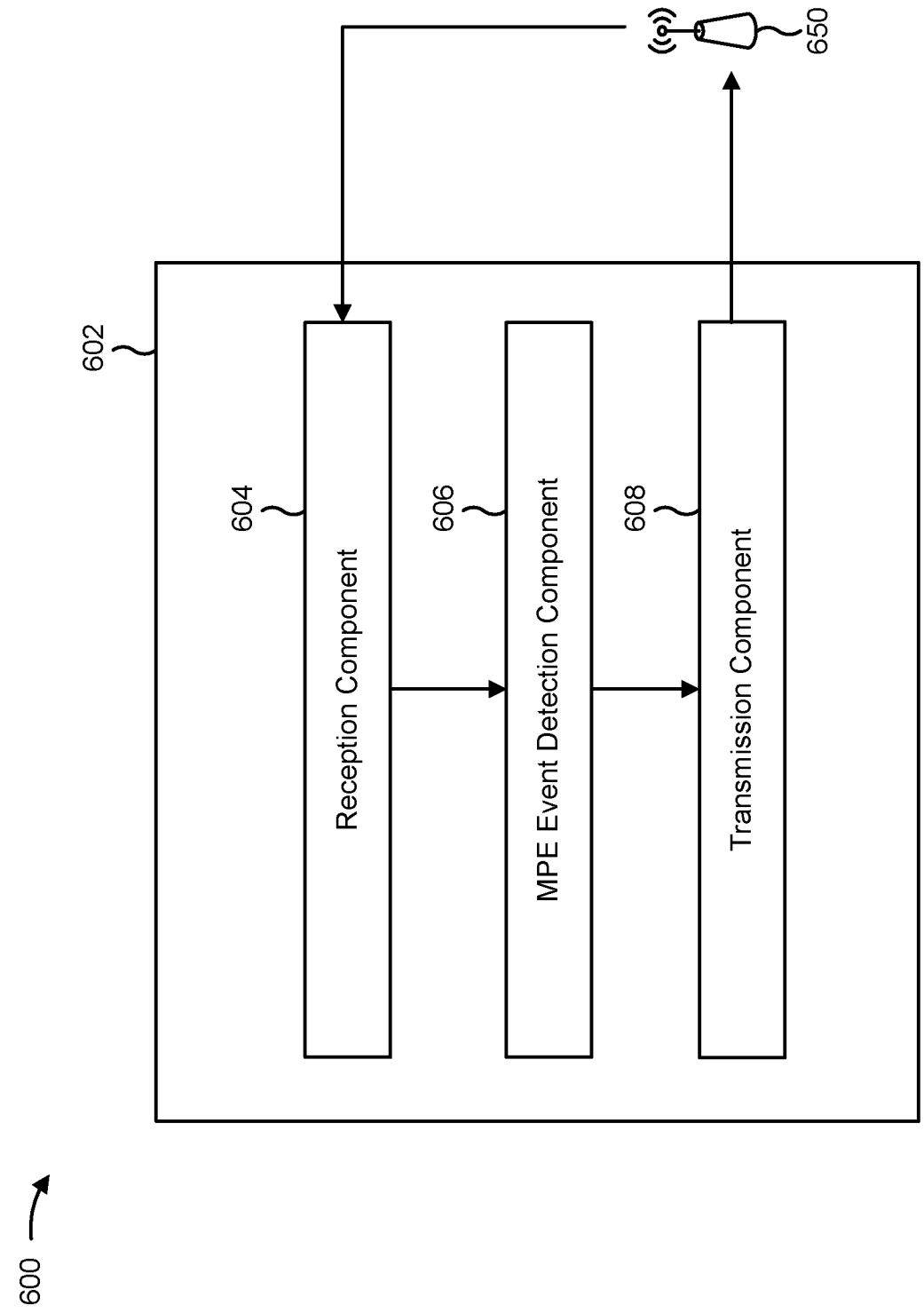
FIG. 6 is a conceptual data flow diagram illustrating a data flow between different components in an example apparatus, in accordance with various aspects of the present disclosure.

FIG. 6 is a conceptual data flow diagram 600 illustrating a data flow between different components in an example apparatus 602. The apparatus 602 may be a UE. In some aspects, the apparatus 602 includes a reception component 604, an MPE event detection component 606, and/or a transmission component 608. As shown, the apparatus 602 may communicate with another apparatus 650 (e.g., a UE, a base station, or another wireless communication device) using the reception component 604 and/or the transmission component 608.

Reception component 604 may receive one or more downlink communications from apparatus 650. For example, reception component 604 may receive a random access response message, downlink control information (DCI), and/or other suitable downlink communications scheduling a PUSCH in which the apparatus 602 is to transmit a maximum permissible exposure (MPE) medium access control (MAC) control element (MAC-CE) to report an MPE event detected on a particular cell. Additionally, or alternatively, reception component 604 may receive DCI acknowledging the MPE MAC-CE, DCI and/or RRC signaling to cause apparatus 602 to switch bandwidth parts due to a reported MPE event, and/or the like. In some aspects, reception component 604 may include an antenna (e. g., antenna 252), a receive processor (e. g, receive processor 258), a controller/processor (e. g., controller/processor 280), a transceiver, a receiver, and/or the like.

MPE event detection component 606 may detect one or more MPE events that occur when apparatus 602 is transmitting information (e.g., on an uplink). For example, MPE event detection component 606 may detect the MPE event based at least in part on a human body, body part, and/or the like blocking an uplink beam, being located near an antenna subarray, and/or the like (e.g., using ultrasound, using wideband and/or narrowband ranging techniques, and/or the like). In some aspects, MPE event detection component 606 may include a processor (e.g., a transmit processor 264, a receive processor 258, a controller/processor 280, and/or the like).

Transmission component 610 may transmit one or more uplink communications to apparatus 650. For example, transmission component 610 may transmit an uplink message on an uplink channel associated with a special cell (Spcell) to trigger MPE reporting based at least in part on an MPE event, may transmit an MPE MAC-CE to report the MPE event on a PUSCH associated with the Spcell or a secondary cell (Scell), and/or the like. In some aspects, transmission component 610 may include an antenna (e. g, antenna 252), a transmit processor (e. g, transmit processor 264), a controller/processor (e.g., controller/processor 280), a transceiver, a transmitter, and/or the like.

The apparatus may include additional components that perform each of the blocks of the algorithm in the aforementioned process 500 of FIG. 5 and/or the like. Each block in the aforementioned process 500 of FIG. 5 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

FIG. 7 is a diagram 700 illustrating an example of a hardware implementation for an apparatus 705 employing a processing system 710. In some aspects, the apparatus 705 may be a UE.

The processing system 710 may be implemented with a bus architecture, represented generally by the bus 715. The bus 715 may include any number of interconnecting buses and bridges depending on the specific application of the processing system 710 and the overall design constraints. The bus 715 links together various circuits including one or more processors and/or hardware components, represented by the processor 720, the components 604, 606, and/or 608, and the computer-readable medium/memory 725. The bus 715 may also link various other circuits such as timing sources, peripherals, voltage regulators, and power management circuits, which are well known in the art, and therefore will not be described any further.

The processing system 710 may be coupled to a transceiver 730. The transceiver 730 is coupled to one or more antennas 735. The transceiver 730 provides a means for communicating with various other apparatuses over a transmission medium. The transceiver 730 receives a signal from the one or more antennas 735, extracts information from the received signal, and provides the extracted information to the processing system 710, specifically the reception component 604. In addition, the transceiver 730 receives information from the processing system 710, specifically the transmission component 608, and based at least in part on the received information, generates a signal to be applied to the one or more antennas 735.

The processing system 710 includes a processor 720 coupled to a computer-readable medium/memory 725. The processor 720 is responsible for general processing, including the execution of software stored on the computer-readable medium/memory 725. The software, when executed by the processor 720, causes the processing system 710 to perform the various functions described herein for any particular apparatus. The computer-readable medium/memory 725 may also be used for storing data that is manipulated by the processor 720 when executing software. The processing system further includes at least one of the components 604, 606, and/or 608. The components may be software modules running in the processor 720, resident/ stored in the computer readable medium/memory 725, one or more hardware modules coupled to the processor 720, or some combination thereof.

In some aspects, the processing system 710 may be a component of the UE 120 and may include the memory 282 and/or at least one of the TX MIMO processor 266, the RX processor 258, and/or the controller/processor 280. In some aspects, the apparatus 705 for wireless communication includes means for transmitting an uplink message on an uplink channel associated with an Spcell to trigger MPE reporting based at least in part on an MPE event and means for transmitting an MPE MAC-CE on a PUSCH associated with the Spcell or an Scell to report the MPE event. The aforementioned means may be one or more of the aforementioned components of the apparatus 602 and/or the processing system 710 of the apparatus 705 configured to perform the functions recited by the aforementioned means. As described elsewhere herein, the processing system 710 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

As indicated above, FIG. 7 is provided as an example. Other examples may differ from what is described with respect to FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   transmitting an uplink message on an uplink channel associated with a special cell (Spcell) to trigger maximum permissible exposure (MPE) reporting based at least in part on an MPE event; and
   transmitting an MPE medium access control (MAC) control element (MAC-CE) to report the MPE event, wherein the MPE MAC-CE is transmitted on a physical uplink shared channel (PUSCH) associated with the Spcell or a secondary cell (Scell);
   wherein the uplink message is transmitted to trigger at least one of a physical random access channel (PRACH) procedure on the Spcell based at least in part on detecting the MPE event on the Spcell, or a scheduling request procedure on a physical uplink control channel (PUCCH) of the Spcell based at least in part on detecting the MPE event on one or more of an Scell or a secondary primary cell (SPcell).

2. The method of claim 1, wherein the uplink message is transmitted on a bandwidth part associated with the Spcell that is configured with PRACH resources.

3. The method of claim 2, wherein the bandwidth part used to transmit the uplink message is associated with one or more of an uplink carrier or a supplemental uplink carrier associated with the Spcell.

4. The method of claim 2, wherein the bandwidth part used to transmit the uplink message is associated with an uplink carrier on which the MPE event is detected.

5. The method of claim 2, wherein the bandwidth part used to transmit the uplink message is associated with a supplemental uplink carrier in a low frequency band.

6. The method of claim 1, wherein the PUSCH used to transmit the MPE MAC-CE is associated with a bandwidth part in which the uplink message triggering the PRACH procedure is transmitted.

7. The method of claim 1, wherein the PUSCH used to transmit the MPE MAC-CE is associated with a bandwidth part in a cell group that includes the Spcell.

8. The method of claim 1, wherein the Spcell or Scell associated with the PUSCH used to transmit the MPE MAC-CE excludes the Scell or the SPcell in which the MPE event is detected.

9. The method of claim 1, further comprising:
   cancelling the MPE reporting for a cell associated with the MPE event based at least in part on transmitting the MPE MAC-CE.

10. The method of claim 1, further comprising:
cancelling the MPE reporting for a cell associated with the MPE event based at least in part on receiving information scheduling a new PUSCH having a hybrid automatic repeat request (HARQ) identifier that corresponds to the PUSCH used to transmit the MPE MAC-CE.

11. The method of claim 1, further comprising:
cancelling the MPE reporting for a cell associated with the MPE event based at least in part on receiving downlink control information scrambled by a radio network temporary identifier on a control resource set used to acknowledge the MPE MAC-CE.

12. The method of claim 1, further comprising:
cancelling the MPE reporting for an Scell or a primary secondary cell (PScell) associated with the MPE event based at least in part on the Scell or the PScell being deactivated, removed, or transitioned to a dormancy state.

13. The method of claim 1, further comprising:
cancelling the MPE reporting for an Scell or a primary secondary cell (PScell) associated with the MPE event based at least in part on a MAC reset affecting a serving cell corresponding to the Scell or the PScell.

14. The method of claim 1, further comprising:
cancelling the MPE reporting for an Spcell associated with the MPE event based at least in part on successful completion of a random access procedure initiated after switching from a first bandwidth part to a second bandwidth part due to the MPE event.

15. The method of claim 1, further comprising:
cancelling the MPE reporting based at least in part on receiving downlink control information (DCI) or radio resource control (RRC) signaling causing a switch from a first bandwidth part to a second bandwidth part.

16. The method of claim 1, further comprising:
terminating an ongoing random access procedure and initiating a new random access procedure based at least in part on the MPE event causing a switch from a first bandwidth part to a second bandwidth part on the Spcell.

17. The method of claim 16, further comprising:
resetting a preamble and power ramping counter associated with the ongoing random access procedure based at least in part on initiating the new random access procedure.

18. A user equipment (UE) for wireless communication, comprising:
a memory; and
one or more processors operatively coupled to the memory, the memory and the one or more processors configured to:
transmit an uplink message on an uplink channel associated with a special cell (Spcell) to trigger maximum permissible exposure (MPE) reporting based at least in part on an MPE event; and
transmit an MPE medium access control (MAC) control element (MAC-CE) to report the MPE event, wherein the MPE MAC-CE is transmitted on a physical uplink shared channel (PUSCH) associated with the Spcell or a secondary cell (Scell);
wherein the uplink message is transmitted to trigger at least one of a physical random access channel (PRACH) procedure on the Spcell based at least in part on detecting the MPE event on the Spcell, or a scheduling request procedure on a physical uplink control channel (PUCCH) of the Spcell based at least in part on detecting the MPE event on one or more of an Scell or a secondary primary cell (SPcell).

19. The UE of claim 18, wherein the memory and the one or more processors are further configured to:
cancel the MPE reporting for a cell associated with the MPE event based at least in part on transmitting the MPE MAC-CE.

20. The UE of claim 18, wherein the memory and the one or more processors are further configured to:
cancel the MPE reporting for a cell associated with the MPE event based at least in part on receiving information scheduling a new PUSCH having a hybrid automatic repeat request (HARQ) identifier that corresponds to the PUSCH used to transmit the MPE MAC-CE.

21. The UE of claim 18, wherein the memory and the one or more processors are further configured to:
cancel the MPE reporting for a cell associated with the MPE event based at least in part on receiving downlink control information scrambled by a radio network temporary identifier on a control resource set used to acknowledge the MPE MAC-CE.

22. The UE of claim 18, wherein the memory and the one or more processors are further configured to:
cancel the MPE reporting for an Scell or a primary secondary cell (PScell) associated with the MPE event based at least in part on the Scell or the PScell being deactivated, removed, or transitioned to a dormancy state.

23. The UE of claim 18, wherein the memory and the one or more processors are further configured to:
cancel the MPE reporting for an Scell or a primary secondary cell (PScell) associated with the MPE event based at least in part on a MAC reset affecting a serving cell corresponding to the Scell or the PScell.

24. The UE of claim 18, wherein the memory and the one or more processors are further configured to:
cancel the MPE reporting for an Spcell associated with the MPE event based at least in part on successful completion of a random access procedure initiated after switching from a first bandwidth part to a second bandwidth part due to the MPE event.

25. The UE of claim 18, wherein the memory and the one or more processors are further configured to:
cancel the MPE reporting based at least in part on receiving downlink control information (DCI) or radio resource control (RRC) signaling causing a switch from a first bandwidth part to a second bandwidth part.

26. The UE of claim 18, wherein the memory and the one or more processors are further configured to:
terminate an ongoing random access procedure and initiate a new random access procedure based at least in part on the MPE event causing a switch from a first bandwidth part to a second bandwidth part on the Spcell.

* * * * *